Figure 1A:
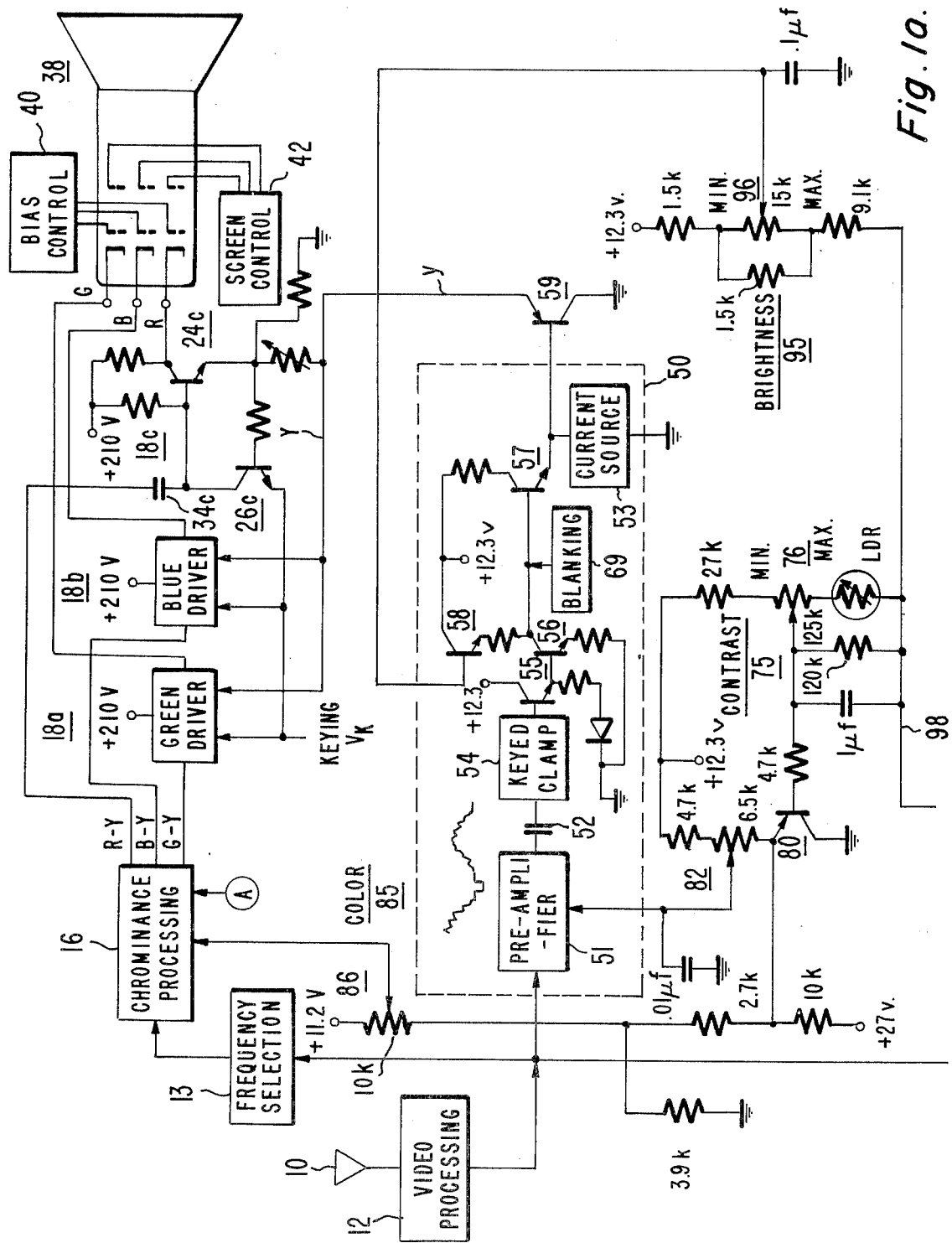

United States Patent [19]

Cochran et al.

[11] 4,123,776
[45] Oct. 31, 1978

[54] SERVICE SWITCH ARRANGEMENT FOR A COLOR TELEVISION RECEIVER

[75] Inventors: Larry A. Cochran; Robert L. Shanley, II, both of Indianapolis, Ind.

[73] Assignee: RCA Corporation, New York, N.Y.

[21] Appl. No.: 796,338

[22] Filed: May 12, 1977

[51] Int. Cl.² .............................................. H04N 9/62
[52] U.S. Cl. .................................................... 358/10
[58] Field of Search .......................................... 358/10

[56] References Cited
U.S. PATENT DOCUMENTS 3,525,801    8/1970    Willis .................................... 358/10

Primary Examiner—Richard Murray
Attorney, Agent, or Firm—Eugene M. Whitacre; William H. Meagher; Ronald H. Kurdyla

[57] ABSTRACT

A service switch in a color television receiver for simulating quiescent signal conditions to permit set-up adjustment of a color image reproducing kinescope responsive to luminance and chrominance signals processed by luminance and chrominance channels of the receiver. Separate, adjustable image brightness and contrast control networks are coupled to the luminance channel for respectively varying a D.C. level and peak-to-peak amplitude of the luminance signal. The switch has "normal" and "service" positions and is coupled to the chrominance channel, brightness and contrast networks, and a vertical deflection circuit of the receiver. In the "service" position, the switch renders the chrominance channel inoperative to process the chrominance signal, and disables vertical scanning of the kinescope. The switch also causes the brightness and contrast networks to establish predetermined values of the D.C. level and peak amplitude of the luminance signal substantially independent of the setting of the brightness and contrast networks, to facilitate proper service adjustment of the kinescope.

13 Claims, 5 Drawing Figures

SERVICE SWITCH ARRANGEMENT FOR A COLOR TELEVISION RECEIVER

The present invention relates to color television receivers and, in particular, to apparatus for facilitating the set-up and servicing of a color kinescope included in such receivers.

Set-up of a color kinescope entails color temperature adjustments among a number of other adjustments. The color temperature adjustment takes into account the differences of the cathode emissions of the several electron beam producing guns of the kinescope and the differences in the efficiencies of the several phosphors of the kinescope. The color temperature adjustment typically involves adjusting direct control voltages applied between cathodes and grids of the kinescope and the A.C. gain of the kinescope drivers such that white information is reproduced with the proper color temperature at all brightness levels between minimum and maximum white, with the maximum white level being produced at the highest achievable level of brightness consistent with good image clarity.

Service switch arrangements included in color television receivers are known which provide a convenient means for factory and service personnel to make adjustments without the need for additional equipment. Typically, service switch arrangements provide "normal" and "service" positions. When the service switch arrangement is in the "normal" position, the receiver operates to couple video signals to the kinescope for normal image viewing.

When the service switch is in the "service" position, the vertical deflection circuits are disabled the chrominance and luminance signals are decoupled from the kinescope so that the kinescope is in a quiescent operating condition. The direct control signals coupled to the grids (or cathodes) of each gun are gradually controlled until that gun produces a barely visible, narrow horizontal line on the kinescope. When all three guns have been so energized, the line will appear, from a suitable distance, as a white line of low brightness level.

In the service or adjustment mode of operation of a color television receiver, it is desirable that the service switch control the various portions of the receiver with which it is coupled by direct current (D.C.) control signal connections rather than by alternating current (A.C.) control signal connections, the minimize stray signal pick-up and other problems associated with long conductive leads coupling alternating signals. A service switch arrangement which provides this manner of control is disclosed in U.S. Pat. No. 3,959,811 (R. L. Shanley, II) assigned to the same assignee as the present invention.

In some color television receiver systems, in order to accurately simulate quiescent operating conditions to facilitate proper set-up of the color receiver, it is advantageous for the radio frequency and intermediate frequency amplifier and detector stages which provide the composite video signal containing luminance, chrominance and synchronizing signal components to remain operative during the service adjustment mode. Such a system is described in a copending U.S. patent application Ser. No. 764,065 entitled "Set-Up Arrangement For A Color Television Receiver", of R. L. Shanley, II, filed Jan. 31, 1977 and assigned to the same assignee as the present invention. In such case, care must be taken to assure that the chrominance and luminance components do not interfere with the set-up adjustment in the service mode.

In accordance with the present invention, a control arrangement is provided in a system for processing an image representative composite color video signal containing chrominance, luminance and synchronizing signal components. The system includes a signal channel for processing the chrominance and luminance components to develop output signals, a color image reproducing device responsive to the output signals, and a deflection circuit associated with the image reproducing device for providing horizontal and vertical scanning of the reproducing device in response to the synchronizing component. Adjustable image brightness and contrast control networks coupled to the signal channel serve to vary the D.C. level and the peak amplitude of the output signals, respectively. A switch coupled to the signal channel, deflection circuit and brightness and contrast control networks also is included. A first position of the switch renders the signal channel, deflection circuit and brightness and contrast control networks normally operative. A second position of the switch renders the signal channel inoperative to process the chrominance component, deflection circuit inoperative to provide scanning of the image reproducing device in one direction, and causes the brightness and contrast control networks to establish predetermined values of the D.C. level and peak amplitude of the output signals substantially independent of the setting of the brightness and contrast control networks, to permit service adjustment of the image reproducing device.

Figure 1B:
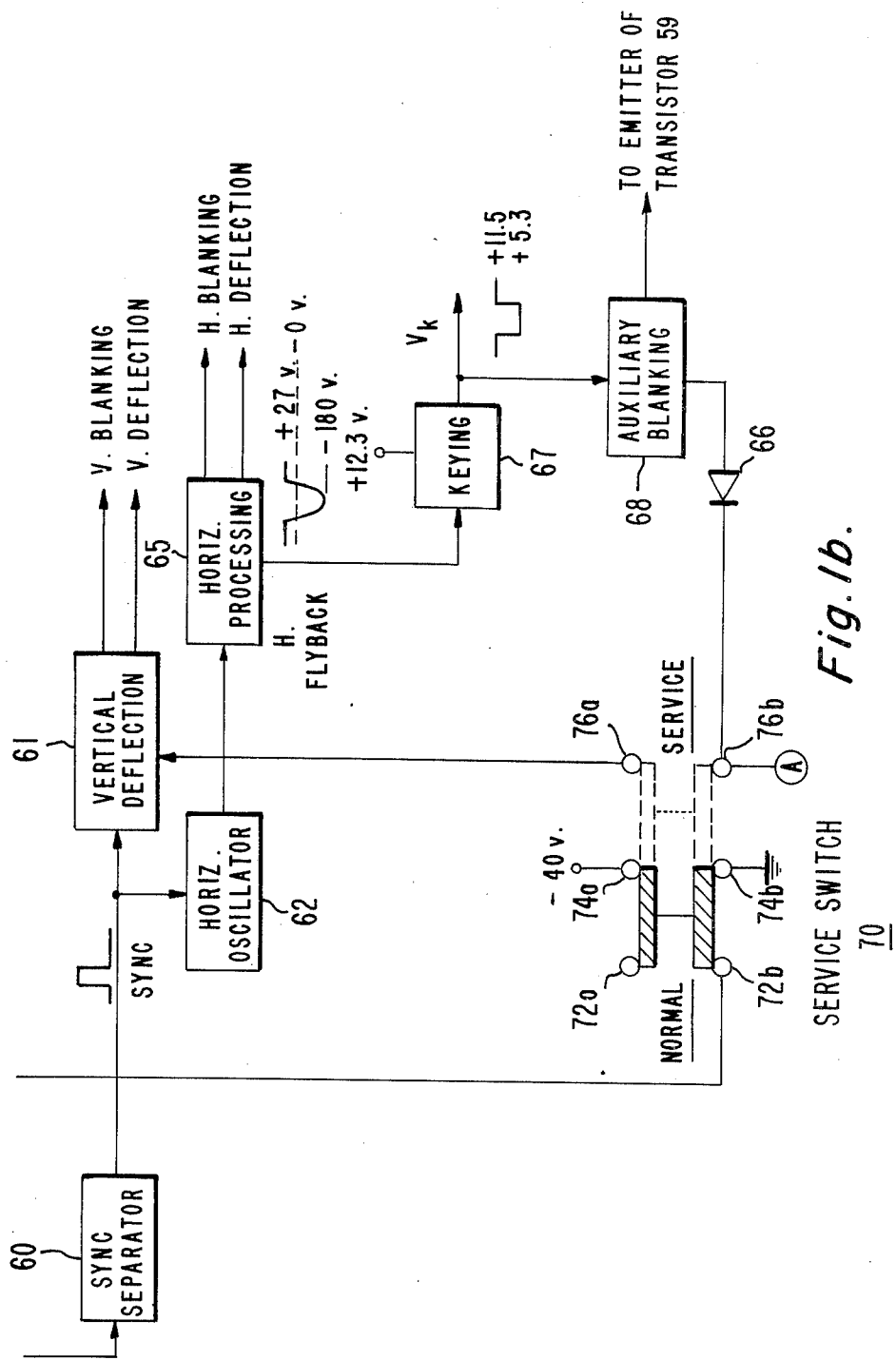
Figure 2:
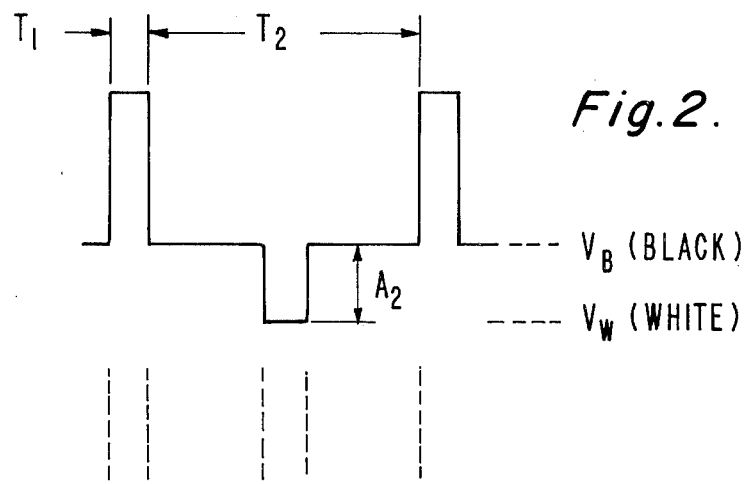
Figure 3:
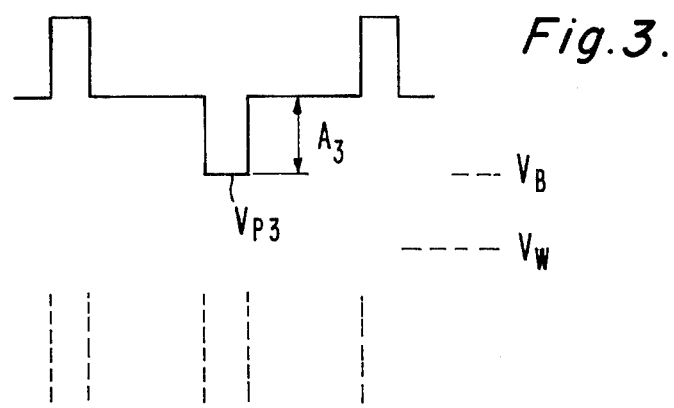
Figure 4:
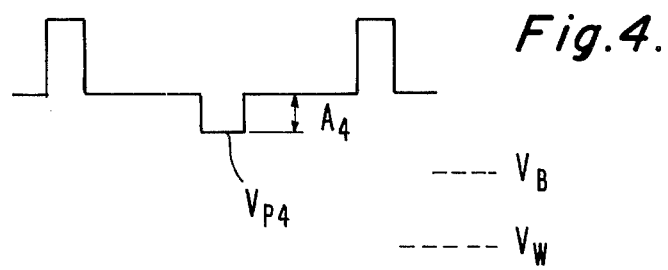

In the drawing:

FIGS. 1a and 1b show, partially in block diagram form and partially in schematic circuit diagram form, the general arrangement of a color television receiver employing an apparatus constructed in accordance with the present invention; and FIGS. 2–4 show signal waveforms useful in understanding the operation of apparatus constructed in accordance with the invention.

In the following description it will be helpful to refer concurrently to FIGS. 1a and 1b which are parts of the same arrangement.

In FIGS. 1a and 1b, there is shown a color television receiver including a video processing unit 12 for receiving from an antenna 10 radio frequency (RF) signals and for translating these signals through an intermediate frequency (IF) amplifying and detecting portion (not shown) to form a composite video signal. The composite video signal comprises chrominance, luminance and synchronizing (sync) signal components.

A frequency selection unit 13 selectively couples the chrominance component to a chrominance channel, including a chrominance processing unit 16 for processing the chrominance component to derive R-Y, B-Y and G-Y color difference signals. The color difference signals are coupled to respective inputs to kinescope driver stages 18a, 18b and 18c. The kinescope driver stages combine the R-Y, B-Y and G-Y color difference signals with a luminance output signal, Y, form a luminance channel of the receiver to derive R, B and G color signals.

The R, B and G color signals are respectively applied to cathodes of the three electron guns of kinescope 38. Each gun, for example, comprises a cathode, a control grid and a screen grid to develop and accelerate an electron beam. Focus and ultor electrodes (not shown) also are provided. Direct bias control voltages are coupled to the control grids from a bias control unit 40. Direct screen control voltages are coupled to the screen grids from screen control unit 42 to permit adjustment of the cut-off point of each gun.

Kinescope driver stages 18a, 18b and 18c are similar and are of the type described in U.S. Pat. No. 3,970,895 granted to D. H. Willis and assigned to the same assignee as the present invention. Stage 18c comprises an amplifier transistor 24c for combining and amplifying the R-Y color difference signal and the luminance output signal Y to derive the color signal R at a collector output. Stage 18c also comprises a keyed clamping circuit including a keyed clamping transistor 26c arranged in feedback relation with transistor 24c as shown, and operatively associated with a signal coupling capacitor 34c. Capacitor 34c and keyed transistor 26c serve to establish a desired reference level for signals processed by transistor 24c, substantially independent of the direct current conditions of chrominance processing unit 16 and the base-to-emitter voltage variations of transistor 24c. The clamping action occurs when transistor 26c is rendered conductive in response to a keying signal during each horizontal flyback (retrace blanking) interval of the video signal. Stages 18a and 18b are similarly arranged and operate in the same manner as stage 18c.

The output of video processing unit 12 also is coupled to a sync separator 60 for deriving periodic line sync pulses from the video signal. The derived sync pulses are substantially time coincident with and correspond to the sync component of the video signal and are coupled to a horizontal deflection stage including a horizontal oscillator 62 and horizontal signal processing circuits 65, and to a vertical deflection stage 61.

Periodic vertical deflection and blanking signals from stage 61 are respectively coupled to vertical deflection windings associated with kinescope 38 (not shown) and to a blanking unit 69 in the luminance channel. Periodic horizontal deflection and blanking signals from unit 65 are coupled to horizontal deflection windings associated with kinescope 38 (not shown) and to blanking unit 69. Periodic, negative horizontal flyback pulses occurring during the horizontal retrace interval of the video signal are also provided by unit 65, and coupled to a keying unit 67.

Keying unit 67 can be of the type disclosed in U.S. Pat. No. 3,984,864 (D. H. Willis), and generates a periodic keying signal $V_K$ during each horizontal line retrace blanking interval in response to and substantially coincident with each horizontal flyback pulse. The keying signals control the operation of the keyed transistors (e.g., 26c) of the kinescope driver stages during the horizontal retrace interval as described in U.S. Pat. No. 3,970,895.

Keying signal $V_K$ also is coupled to an input of an auxiliary (reserve) blanking unit 68. Blanking unit 68 normally provides auxiliary output blanking pulses which are coupled to an emitter of transistor 59 to inhibit kinescope operation during vertical retrace-horizontal trace intervals, to thereby inhibit the formation of disconcerting horizontal lines. Auxiliary blanking unit 68 can be of the type described in U.S. Pat. No. 3,984,864 (D. H. Willis) assigned to the same assignee as the present invention.

A luminance channel of the receiver comprises a luminance signal processor 50 and a PNP luminance signal driver transistor 59. The luminance component is preamplified and otherwise translated by a preamplifier 51 of unit 50, for providing a "sync tip negative" luminance signal at an output. The preamplified luminance signal is clamped to a reference level during so-called front and back porch portions of the horizontal blanking interval by a clamping network including a coupling capacitor 52 and a keyed clamp 54 of conventional type. The clamped luminance signal is coupled to transistor 59 via a signal translating network including transistors 55, 56 and 57. A current source 53 is associated with transistor 57. Not shown is a resistor coupled between an emitter of transistor 55 and a junction point to which a base of transistor 56 is coupled. Periodic blanking pulses from blanking unit 69 inhibit conduction of the luminance signal through transistor 57 during horizontal and vertical image blanking (retrace) intervals. Transistor 59 is non-conductive at this time.

A brightness control network 95 comprises a resistive voltage divider including a viewer operated brightness control potentiometer 96 and a regulated source of potential (+12.3 volts) arranged as shown. A brightness control voltage normally appearing on a wiper of potentiometer 96 is coupled via an emitter follower transistor 58 of unit 50 to a collector output of transistor 56, for altering the D.C. level of the clamped luminance signal in accordance with the setting of the wiper. The D.C. level of the luminance signal is determinative of image brightness, so that adjustment of the D.C. level of the clamped luminance signal in accordance with the setting of potentiometer 96 serves to adjust the brightness of a reproduced image between minimum (MIN) and maximum (MAX) brightness levels. The cooperating combination of brightness network 95, keying unit 67 and keyed driver stages 18a-18c is described in detail in a copending U.S. patent application of R. L. Shanley, II, entitled "Brightness Control Circuit With Predictable Brightness Control Range", Ser. No. 796,340, filed May 12, 1977 and assigned to the same assignee as the present invention.

A contrast control network 75 comprises a resistive voltage divider including a viewer operated contrast control potentiometer 76, a regulated source of voltage (+12.3 volts), and a light dependent resistor (LDR) responsive to ambient light conditions, all arranged as shown. A contrast control voltage normally appearing on a wiper of potentiometer 96 is D.C. translated by a transistor 80, and appears at an emitter of transistor 80. The translated contrast control voltage is applied through a pre-set potentiometer 82 to a control input of preamplifier 51 of unit 50, for altering the peak-to-peak amplitude of the luminance signal in accordance with the setting of the wiper. This can be accomplished, for example, by altering the gain of an amplifier transistor included in preamplifier 51 in accordance with known techniques. The contrast of a reproduced image is a function of the peak-to-peak amplitude of the luminance signal, so that the contrast of a reproduced image is adjusted in accordance with the setting of potentiometer 76 between minimum (MIN) and maximum (MAX) contrast levels.

The voltage appearing at the emitter of transistor 80 also is coupled to a control input of chrominance unit 16 via a color control network 85, including a viewer adjustable color control potentiometer 86 and an associated operating voltage (+11.2 volts). The signal gain of chrominance unit 16 and thereby the amplitude of signals processed by unit 16 are adjusted in accordance with the setting of potentiometer 86, and with the setting of contrast potentiometer 76, since the translated contrast control voltage from transistor 80 is coupled to color potentiometer 86.

Brightness network 95 and contrast network 75 are normally D.C. coupled to a reference voltage (ground) through a common conductor 98 and a service switch 70. Switch 70 facilitates initial adjustment of receiver operating conditions and includes two sets of electrically isolated poles (72a, 74a, 76a and 72b, 74b and 76b) and "normal" and "service" positions. The receiver operates normally in the "normal" position. When in the "service" position, switch 70 permits color temperature adjustments of kinescope 38.

Pole 74a is connected to a source of negative voltage (−40 volts), and pole 76a is D.C. coupled to a control input of vertical deflection unit 61. No connection is made to pole 72a in this example. Pole 72b is D.C. coupled to brightness network 95 and contrast network 75 via conductor 98. Pole 74b is connected to ground, and pole 76b is D.C. coupled through a circuit point A to an additional control input of chrominance processing unit 16. A diode 66 is coupled between pole 76b and an input of auxiliary blanking unit 68.

In the "normal" position, poles 72b and 74b are connected together via a negligible impedance so that pole 72b is at ground potential, to provide a normal reference potential for the brightness and contrast control networks. The adjustable brightness, contrast and color control networks operate in normal fashion, and the chrominance and luminance signals are processed normally as discussed.

In the "service" position, poles 74a and 76a are connected together through a negligible impedance, so that a negative voltage (−40 volts) appears at pole 76a and is coupled to the control input of vertical deflection unit 61. This negative voltage serves to inhibit the operation of vertical unit 61 and thereby vertical scanning of kinescope 38. The displayed image consequently is vertically collapsed to a narrow horizontal line in the center of the display screen of the kinescope.

In addition, in the "service" position, pole 72b is decoupled from ground potential, so that the direct voltage then developed across brightness control potentiometer 96 and contrast control potentiometer 76 (and therefore at the associated wipers) increases to a level substantially equal to the level of the associated operating supplies (+12.3 volts). The additional control input of chrominance unit 16 is grounded via poles 74b, 76b and circuit point A, to reduce the gain of (i.e., bias off) chrominance processing unit 16 so that substantially no chrominance signals are coupled through chrominance processing unit 16 to driver stages 18a-18c.

Diode 66 is returned to ground via poles 76b and 74b in the service position to inhibit the operation of auxiliary blanking unit 68, thereby removing the auxiliary blanking pulses from the kinescope driver stages. The auxiliary blanking pulses would otherwise upset the quiescent operating condition of the kinescope drivers and therefore upset the set-up adjustment of kinescope 38. A service switch arrangement similarly associated with the auxiliary blanking function is described in U.S. Pat. No. 3,959,811 of R. L. Shanley, II. The connection from pole 76b of switch 70 to blanking unit 68 is not necessary in the absence of the auxiliary blanking pulses.

Also, the operating frequency of horizontal oscillator 62 remains stabilized in response to the separated sync pulses, so that receiver operating voltages derived from the horizontal oscillator output signal also remain stabilized during this time, as discussed in detail in the copending U.S. patent application Ser. No. 764,065 of R. L. Shanley, II, mentioned previously.

Reference is now made to FIGS. 2-4 in connection connection with the following discussion. The waveform of FIG. 2 represents the D.C. controlled, clamped luminance signal (simplified for purposes of clarity) normally appearing at the output of luminance unit 50. The waveform comprises a blanking (horizontal retrace) interval $T_1$ containing a blanking pulse, and an image interval $T_2$ containing an image information signal component of peak-to-peak amplitude $A_2$. In this example, amplitude $A_2$ represents a maximum expected image signal amplitude (e.g., of about 2 volts peak-to-peak) between a blanking level $V_B$ approximating a black level of the luminance signal, and a level $V_W$ representing a maximum expected white level.

In this instance, a control voltage normally appearing at the wiper of brightness potentiometer 96 is adjustable about a midrange voltage of +9.8 volts between +10.5 volts (MIN setting) and 9.3 volts (MAX setting). When switch 70 is placed in the "service" position, the wiper voltage of brightness potentiometer 96 rises to the +12.3 volt level of the associated operating supply, since brightness potentiometer 96 is decoupled from the ground reference potential at this time. This control voltage is coupled via transistor 58 and causes the clamped luminance signal at the base of transistor 57 to be D.C. translated a corresponding amount in a "blacker-than-black" direction above black level $V_B$ (see FIG. 3). The peak-to-peak amplitude of the image information component ($A_3$ in FIG. 3) is unaffected by such D.C. level translation, compared to the normal signal of FIG. 2.

For a typically expected midrange setting of potentiometer 96, it is noted that the amount of D.C. translation of the luminance signal in the "blacker-than-black" direction during the service mode is equal to the level of the operating supply of network 95 (+12.3 volts), less the wiper voltage of potentiometer 96 at the midrange brightness setting (+9.8 volts), or +2.5 volts. Thus the image signal component of FIG. 3 is D.C. translated above level $V_B$, in the black direction, by 2.5 volts in the "service" mode (relative to the luminance signal of FIG. 2).

The D.C. level to which the clamped luminance signal is translated during "service" is substantially independent of the normal setting of potentiometer 96. If potentiometer 96 is set at the minimum brightness position (MIN) for instance, the amount of D.C. translation in the black direction during service (approximately two volts) is less than when potentiometer 96 is normally set at the midrange position. This results, since the luminance signal is already D.C. translated toward black level $V_B$ in response to the normal MIN setting. However, the D.C. level of the luminance signal ultimately produced during service is substantially the same for any normal setting of potentiometer 96, and is substantially unaffected by adjustment of potentiometer 96 during service.

Continuing with FIG. 3, a lower peak amplitude level $V_{P3}$ of the image component therefore approaches the black or blanking level $V_B$ during the service mode. This level corresponds to a threshold level of kinescope conduction. If during service the image component were D.C. translated in the "blacker-than-black" direction by a smaller amount, level $V_{P3}$ would be at or below level $V_B$ by an amount sufficient to cause kinescope 38 to conduct. Conduction of kinescope 38 in response to the luminance signal during the service mode would impair the accuracy of the set-up adjustment of kinescope 38 via screen control 42. Such conduction can be caused by many factors, such as variations in the operating characteristics of the kinescope and associated circuits (e.g., due to temperature changes) and by variations in the tolerances of the kinescope and associated circuits, both within a given receiver and from receiver to receiver. Illustratively, the level of the +12.3 volt regulated supply associated with potentiometer 96 can vary from one receiver to the next due to the tolerance of the supply. A five percent decrease in such level causes the wiper voltage of potentiometer 96 to decrease by approximately 0.6 volts during service. All or any one of these factors can cause the kinescope to conduct during the service mode when a peak level of the luminance signal (e.g., $V_{P3}$ in FIG. 3) closely approaches or substantially equals the threshold conduction level of the kinescope (e.g., $V_B$ in FIG. 3).

It therefore is desirable for the image component of the luminance signal to be well within a black range during the service mode. This is accomplished by also decoupling contrast control network 75 from the ground reference potential via common conductor 98. Such decoupling causes the wiper voltage of contrast potentiometer 76 to increase to substantially the level of the contrast control operating supply (+12.3 volts). A translated, increased wiper voltage then applied via transistor 80 to the control input of preamplifier 51 of luminance unit 50 serves to reduce the amplitude of the image component of the luminance signal processed by unit 50, as depicted by FIG. 4.

The waveform of FIG. 4 represents a resultant luminance signal appearing at the output of luminance processor 50 during the service mode. The signal of FIG. 4 exhibits a "blacker-than-black" D.C. level (as produced in response to the voltage appearing at the wiper of brightness potentiometer 96 during the service mode), and an image component of reduced peak amplitude $A_4$, also within the "blacker-than-black" range (as produced in response to the voltage appearing at the wiper of contrast potentiometer 76 during the service mode). Since the image component of the luminance signal (FIG. 4) is well within the "blacker-than-black" range, kinescope 38 is prevented from conducting during the service mode in response to the luminance signal. Proper set-up adjustment of kinescope 38 therefore is unimpeded by the luminance signal.

It is also noted that the amplitude of the signals processed by chrominance unit 16 are significantly reduced during the service mode, since the control voltage developed at the wiper of color control potentiometer 86 is a function of the contrast control voltage appearing at the emitter of transistor 80 at this time. For example, in the normal mode, adjustment of potentiometer 76 to produce reduced image contrast also serves to reduce the amplitude of signals processed by chrominance unit 16. Accordingly, the amplitudes of the signals processed by chrominance unit 16 and luminance unit 50 are attenuated concurrently in the service mode, independent of the respective settings of a color potentiometer 86 and contrast potentiometer 75.

Since vertical scanning of kinescope 38 is disabled during service to produce a narrow horizontal line on the face of kinescope 38, signals of even very small magnitude coupled to kinescope 38 are "magnified" so as to produce a visible effect which can adversely affect the accuracy of set-up adjustments. Such effect is essentially eliminated with respect to the luminance signal, since the image information component thereof is translated in the "blacker-than-black" direction as discussed. However, to insure that residual chrominance signals do not adversely affect the set-up adjustments, the additional control input of chrominance unit 16 is grounded via circuit point A and terminal 76b of switch 70 during service. The additional control input can be operatively associated with a circuit bias point within chrominance unit 16, for example, for upsetting or removing a predetermined circuit bias so as to deactivate the chrominance signal processing function when such additional control input is returned to a suitable potential (e.g., ground).

What is claimed is:

1. In a system for processing an image representative composite color video signal containing luminance, chrominance and synchronizing signal components, said system including a signal channel for processing said luminance and chrominance components to develop output signals, a color image reproducing device responsive to said output signals; deflection means associated with said image device for providing horizontal and vertical scanning of said image reproducing device in response to said synchronizing component; control apparatus comprising:

adjustable image brightness control means coupled to said signal channel and providing a control voltage thereto for varying the D.C. level of said output signals;

adjustable image contrast control means coupled to said signal channel and providing a control voltage thereto for varying the peak amplitude of said output signals; and switching means coupled to said signal channel, deflection means, and brightness and contrast control means, said switching means having
a first position for selectively rendering said signal channel, deflection means, and brightness and contrast control means normally operative; and
a second position for selectively rendering said signal channel inoperative to process said chrominance component, said deflection means inoperative to provide scanning of said image device in one direction, and for causing said brightness and contrast control means to respectively provide predetermined control voltages to said channel substantially independent of the setting of said brightness and contrast control means to establish predetermined values of said D.C. level and said peak amplitude of said output signals, to permit service adjustment of said image reproducing device.

2. Apparatus according to claim 1, wherein said deflection means comprises: p1 horizontal deflection means responsive to said synchronizing component for providing horizontal deflection scanning signals for said image device; and p1 vertical deflection means responsive to said synchronizing component for providing vertical deflection scanning signals for said image device, said vertical deflection means being coupled to said switching means and rendered inoperative to provide vertical scanning of said image device in said second position.

3. Apparatus according to claim 1, wherein:
said brightness and contrast control means each comprises a voltage divider coupled between first and second potentials, respectively, when said switching means is in said first position.

4. Apparatus according to claim 1, wherein:
said predetermined values established in said second position correspond to a D.C. level and peak amplitude of said output signals within a black range of an image reproduced by said image reproducing device.

5. Apparatus according to claim 1, wherein:
said switching means is direct current coupled to said signal channel, deflection means, and brightness and contrast control means.

6. Apparatus according to claim 1, wherein:
said signal channel comprises a luminance channel for processing said luminance component, a chrominance channel for processing said chrominance component, and means for coupling output signals from said luminance and chrominance channels to said color image reproducing device;
said brightness control means is coupled to said luminance channel for varying the D.C. level of said output luminance signal from said luminance channel;
said contrast control means is coupled to said luminance channel for varying the peak amplitude of said output luminance signal from said luminance channel;
said switching means is coupled to said chrominance channel, deflection means, and brightness and contrast control means;
said first position of said switching means selectively renders said chrominance channel, deflection means, and brightness and contrast control means normally operative; and
said second position of said switching means selectively renders said chrominance channel inoperative to process said chrominance component, said deflection means inoperative to provide vertical scanning of said image device, and causes said brightness and contrast control means to establish predetermined values of said D.C. level and peak amplitude of said output luminance signal.

7. In a system for processing an image representative composite color video signal containing luminance, chrominance and synchronizing signal components, said system including a signal channel for processing said luminance and chrominance components to develop output signals; a color image reproducing device responsive to said output signals; deflection means associated with said image device for providing horizontal and vertical scanning of said image reproducing device in response to said synchronizing component; control apparatus comprising:
adjustable image brightness control means coupled to said signal channel for varying the D.C. level of said output signals;
adjustable image contrast control means coupled to said signal channel for varying the peak amplitude of said output signals;
switching means coupled to said signal channel, deflection means, and brightness and contrast control means, said switching means having
a first position for selectively rendering said signal channel, deflection means, and brightness and contrast control means normally operative; and
a second position for selectively rendering said signal channel inoperative to process said chrominance component, said deflection means inoperative to provide scanning of said image device in one direction, and for causing said brightness and contrast control means to establish predetermined values of said D.C. level and said peak amplitude of said output signals substantially independent of the setting of said brightness and contrast control means, to permit service adjustment of said image reproducing device; and wherein
said brightness and contrast control means each comprises a voltage divider coupled between first and second potentials, respectively; and
said switching means provides said respective second potentials in said first position, and modifies said respective second potentials in said second position to establish said predetermined values.

8. In a system for processing an image representative composite color video signal containing luminance, chrominance and synchronizing signal components, said system including a signal channel for processing said luminance and chrominance components to develop output signals; a color image reproducing device responsive to said output signals; deflection means associated with said image device for providing horizontal and vertical scanning of said image reproducing device in response to said synchronizing component; control apparatus comprising:
adjustable image brightness control means coupled to said signal channel for varying the D.C. level of said output signals;
adjustable image contrast control means coupled to said signal channel for varying the peak amplitude of said output signals;
switching means coupled to said signal channel, deflection means, and brightness and contrast control means, said switching means having
a first position for selectively rendering said signal channel, deflection means, and brightness contrast control means normally operative; and
a second position for selectively rendering said signal channel inoperative to process said chrominance component, said deflection means inoperative to provide scanning of said image device in one direction, and for causing said brightness and contrast control means to establish predetermined values of said D.C. level and said peak amplitude of said output signals substantially independent of the setting of said brightness and contrast control means, to permit service adjustment of said image reproducing device; and wherein
said brightness and contrast control means each comprises a voltage divider coupled between first and second potentials, respectively; and
said switching means couples said brightness and contrast control means to said respective second potentials in said first position, and decouples said brightness and contrast control means from said respective second potentials in said second position to establish said predetermined values.

9. In a system for processing an image representative composite color video signal containing luminance, chrominance and synchronizing signal components, said system including a luminance channel for processing said luminance component and a chrominance channel for processing said chrominance component to develop respective luminance and chrominance output signals, said luminance channel including a clamping network for establishing a reference level for said luminance component; a color image reproducing device; means for coupling said luminance and chrominance output signals to said color image reproducing device; deflection means associated with said image device for providing horizontal and vertical scanning of said image reproducing device in response to said synchronizing component; control apparatus comprising:

adjustable image brightness control means coupled to said luminance channel for altering the D.C. level of said output luminance component from said clamping network;

adjustable image contrast control means coupled to said luminance channel for varying the peak amplitude of said output luminance signals; and switching means coupled to said chrominance channel, deflection means, and brightness and contrast control means, said switching means having a first position for selectively rendering said chrominance channel, deflection means, and brightness and contrast control means normally operative; and a second position for selectively rendering said chrominance channel inoperative to process said chrominance component, said deflection means inoperative to provide vertical scanning of said image device, and for causing said brightness and contrast control means to establish predetermined values of said D.C. level and said peak amplitude of said output luminance signal substantially independent of the setting of said brightness and contrast control means, to permit service adjustment of said image reproducing device.

10. In a system for processing an image representative composite color video signal containing luminance, chrominance and synchronizing signal components, said system including a luminance channel for processing said luminance component and a chrominance channel for processing said chrominance component to develop respective luminance and chrominance output signals; a color image reproducing device; means for coupling said luminance and chrominance output signals to said color image reproducing device; deflection means associated with said image device for providing horizontal and vertical scanning of said image reproducing device in response to said synchronizing component; auxiliary blanking means having an input coupled to said deflection means and an output coupled to said image reproducing device, for normally rendering said image reproducing device inoperative to produce a trace image during a period in which said image device is being vertically retraced and horizontally traced; control apparatus comprising:

adjustable image brightness control means coupled to said luminance channel for varying the D.C. level of said output luminance signal;

adjustable image contrast control means coupled to said luminance channel for varying the peak amplitude of said output luminance signal;

switching means coupled to said chrominance channel, deflection means, and brightness and contrast control means, said switching means having a first position for selectively rendering said chrominance channel, deflection means, and brightness and contrast control means normally operative; and a second position for selectively rendering said chrominance channel inoperative to process said chrominance component, said deflection means inoperative to provide vertical scanning of said image device, and for causing said brightness and contrast control means to establish predetermined values of said D.C. level and said peak amplitude of said output luminance signal substantially independent of the setting of said brightness and contrast control means, to permit service adjustment of said image reproducing device; and wherein said auxiliary blanking means is coupled to said switching means and rendered inoperative in said second position.

11. In a system for processing an image representative composite color video signal containing luminance, chrominance and synchronizing signal components, said system including a luminance channel for processing said luminance component and a chrominance channel for processing said chrominance component to develop respective luminance and chrominance output signals; a color image reproducing device; means for coupling said luminance and chrominance output signals to said color image reproducing device; deflection means associated with said image device for providing horizontal and vertical scanning of said image reproducing device in response to said synchronizing component; control apparatus comprising:

adjustable image brightness control means coupled to said luminance channel for varying the D.C. level of said output luminance signal;

adjustable image contrast control means coupled to said luminance channel for varying the peak amplitude of said output luminance signals; and switching means coupled to said chrominance channel, deflection means, and brightness and contrast control means, said switching means having a first position for selectively rendering said chrominance channel, deflection means, and brightness and contrast control means normally operative; and a second position for selectively rendering said chrominance channel inoperative to process said chrominance component, said deflection means inoperative to provide vertical scanning of said image device, and for causing said brightness and contrast control means to establish predetermined values of said D.C. level and said peak amplitude of said output luminance signal substantially independent of the setting of said brightness and contrast control means, to permit service adjustment of said image reproducing device; and wherein said brightness and contrast control means each provide a control voltage for determining said D.C. level and peak amplitude, respectively; and said switching means modifies said control voltages in said second position to establish said predetermined values.

12. Apparatus according to claim 11 and further comprising adjustable image color control means coupled to said chrominance channel and providing a control voltage for varying the peak amplitude of said chrominance component, wherein:

said color control means is coupled to said contrast control means and said color control voltage is a function of said contrast control voltage; and said switching means modifies said color control voltage in said second position for attenuating said peak amplitude of said chrominance component.

13. Apparatus according to claim 12, wherein:
said brightness, contrast and color control means each comprise a variable resistance device.

* * * * *

UNITED STATES PATENT AND TRADEMARK OFFICE
CERTIFICATE OF CORRECTION

PATENT NO. : 4,123,776

DATED : October 31, 1978

INVENTOR(S) : LARRY ALLEN COCHRAN, ET AL.

It is certified that error appears in the above-identified patent and that said Letters Patent is hereby corrected as shown below:

Col. 2, line 57, "inputs to" should read -- inputs of --; line 60, "form" should read -- from --.

Col. 8, line 56, delete "pl"; line 59, delete "pl".

Signed and Sealed this

Eighth Day of May 1979

[SEAL]

Attest:

RUTH C. MASON
Attesting Officer

DONALD W. BANNER
Commissioner of Patents and Trademarks